(12) United States Patent
Metzler et al.

(10) Patent No.: US 6,496,678 B2
(45) Date of Patent: Dec. 17, 2002

(54) METHOD AND APPARATUS FOR SETTING REGISTRATION IN A MULTICOLOR PRINTING MACHINE BASED ON CHANGE IN DIMENSIONS OF PRINTING SUBSTRATE

(75) Inventors: Patrick Metzler, Gettorf (DE); Karlheinz Walter Peter, Gettorf (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/858,044

(22) Filed: May 15, 2001

(65) Prior Publication Data

US 2001/0043823 A1 Nov. 22, 2001

Related U.S. Application Data

(60) Provisional application No. 60/204,848, filed on May 17, 2000.

(51) Int. Cl.[7] .............................................. G03G 15/01
(52) U.S. Cl. ........................ 399/301; 399/394; 399/401
(58) Field of Search ........................... 399/301, 39, 401, 399/394

(56) References Cited

FOREIGN PATENT DOCUMENTS

| JP | 10-268584 | * 10/1998 |
|----|-----------|-----------|
| JP | 2001066948 | * 3/2001 |

* cited by examiner

*Primary Examiner*—Quana M. Grainger
(74) *Attorney, Agent, or Firm*—Lawrence P. Kessler

(57) ABSTRACT

A method and apparatus for setting registration in a multicolor printing machine (1), the print results on print substrates (4) being registered and used to control the production of color separations (3, 3', . . . ) such that in-register prints are achieved. A change L? in the dimensions (7, 8, 7', 8') of the printing substrates (4) is determined by the print, in order to take this change into account such that coincidence can be achieved between a recto print and verso print. This is achieved by the changes in the dimensions (7, 8, 7', 8') of the recto print (6) being determined and being used to control the digital production of the color separations (3, 3', . . . ) for the verso print (5) such that after being printed, it coincides with the recto print (6).

18 Claims, 2 Drawing Sheets

METHOD AND APPARATUS FOR SETTING REGISTRATION IN A MULTICOLOR PRINTING MACHINE BASED ON CHANGE IN DIMENSIONS OF PRINTING SUBSTRATE

CROSS REFERENCE TO RELATED APPLICATION

Reference is made to and priority claimed from U.S. Provisional Application Serial No. 60/204,848, filed on May 17, 2000, entitled: METHOD AND APPARATUS FOR SETTING REGISTER IN A MULTICOLOR PRINTING MACHINE.

BACKGROUND OF THE INVENTION

Field of the Invention

The invention relates to a method and apparatus for setting registration in a multicolor printing machine having a number of exposure devices for the digital production of color separations, the print results being registered and being used to control the production of the color separations such that accurate in-register prints are achieved, and a change in the dimensions of the printing substrates being determined by the print, in order to take this change into account for renewed printing.

Printing colored illustrations, in particular colored images, is carried out by a number of color separations being printed over one another. These are generally the colors yellow, magenta and cyan as well as black. If required, special colors are added. By overprinting these colors, all color combinations can be achieved, the quality of the prints depending significantly on the accurate in-register overprinting of the color separations. In the case of digital printing processes, for example electrostatic printing processes, the maintenance of the register of the overprinting is achieved by the image production devices being controlled in such a way that the color separations meet one another in-register when they are transferred to a printing substrate.

A method and apparatus for color printing are disclosed by EP 0 469 282 A2. In the subject matter of this prior art, these are used to coordinate color separations of a print which are fused separately, that is to say joined to the paper by being melted on, such that the next color separation always fits in exact registration on the color separation or separations already fused. However, in the case of many multicolor printing machines, this problem is dispensed with by all the color separations being fused together.

However, the change in their size has to be taken into account, instead it concerns the fact that a printing substrate is to be printed on both sides, in recto and verso printing for a clean appearance of the prints, it is necessary for the recto printing and the verso printing to be located so that they coincide on the printing substrate. Otherwise the image area of one print, which did not coincide, with the other print would show through the printing substrate. Since the recto printing has to be completed before the verso printing is performed, the problem also occurs here that, for example, as a result of the fusing, the substrate size and, therefore, in a corresponding way the image size changes. If, therefore, recto and verso prints were of equal size when transferred to the printing substrate, it would not be possible for coincidence to be achieved, because of the dimensional changes.

SUMMARY OF THE INVENTION

The invention is based on the object of configuring a method and apparatus such that coincidence of the recto and verso prints can be achieved. With regard to the method, the object is achieved in that the changes in the dimensions of the recto print from the transfer to the printing substrate up to the completion of the recto print are determined and are used to control the digital production of the color separations for the verso print such that, after being printed, it coincides with the recto print. With regard to the apparatus, the object is achieved by the at least one sensor being such that the changes in the dimensions of the recto print from the transfer to the printing substrate up to the completion of the recto print can be determined, and that the controller is designed such that it uses the changes in the dimensions to control the digital production of the color separations for the verso print such that, after being printed, it coincides with the recto print.

With regard to the apparatus, the object is achieved by the at least one sensor being designed and arranged in such a way that the changes in the dimensions of the recto print from the transfer to the printing substrate up to the completion of the recto print can be determined, and that the controller is designed in such a way that it uses the changes in the dimensions to control the digital production of the color separations for the verso print in such a way that, after being printed, it coincides with the recto print.

The invention makes it possible to achieve exact coincidence of recto and verso prints, it being immaterial whether the dimensional changes have been caused by the fusing or in another way. As a result, for example for color copiers, it is possible to achieve a quality in the area of recto and verso printing which previously could not be attained. Since a registration control system is present in any case for the digital production of the color separations, the measure according to the invention often merely requires the appropriate setting up of the existing controllers. In addition, sensors, which are present, in any case can often be used as sensors for registering the dimensions of the recto print. It is therefore often possible, by the invention, to achieve a significant improvement in quality without great outlay and therefore very economically.

Determining the dimensional changes of the recto print from the transfer to the printing substrate up to the completion of the recto print can be performed in various ways. For example, it is possible to use values from image files or values based on experience, or to measure the dimensions of the image area directly or to determine them in another way, but it is also possible for the dimensions of the printing substrate up to the printing and after the completion of the recto print to be used as a correlating measure of the changes in the dimensions of the recto print.

One configuration of the apparatus provides for at least one sensor to be arranged such that the changes in the dimensions of the recto print from the transfer to the printing substrate up to the completion of the recto print can be determined. Here, provision can also be made for at least one sensor to be arranged such that the dimensions of the printing substrate up to the printing and after the completion of the recto print can be registered as a correlating measure of the changes in the dimensions of the recto print.

An advantageous configuration provides for the dimensions of the recto print to be determined after fusing and compared with the dimensions of the digitally produced color separations of the recto print, the changes in the dimensions being used to control the digital production of the color separations of the verso print. The advantage is that the data relating to the dimensions of the digitally produced color separations of the recto print are present in any case, and it is, therefore, only additionally necessary to determine the dimensions of the completed recto print. Since fusing is the operation during which the changes in dimensions essentially take place, it is expedient to determine the dimensions of the recto print after fusing. With respect to the apparatus, provision is then made for the at least one sensor to be arranged such that it determines the dimensions of the recto print after fusing, and for the controller to compare these dimensions with the dimensions of the digitally produced color separations of the recto print, and controls the digital production of the color separations of the verso print in order to achieve coincidence. The dimensions of the digitally produced color separations can be taken from image files, which are stored in a memory. Such a memory with image files for controlling the production of the prints is present in any case on a machine, and it is, therefore, the simplest solution to fall back on these image files.

In order to register the changes in the dimensions, both the widths of the recto print and the lengths, or both dimensions can be registered. With respect to the apparatus, provision is then made for at least one sensor for registering these dimensions to be arranged appropriately. If only one of the dimensions is registered, it is then possible for the other dimension to be calculated from a previously determined relationship between the length and width changes. With respect to the apparatus, the controller must then appropriately perform this calculation.

With respect to the production of the color separations of the verso print, the changes in the dimensions are best taken into account by the line spacing of the image lines and/or the line length of the color separations of the verso print being changed in order to achieve coincidence. In this case, the verso print is given exactly the format of the recto print on the other side of the printing substrate in order to achieve coincidence, which is then maintained during the fusing of the verso print as well. With respect to the apparatus, the controller changes the line spacings of the image lines and, if appropriate, also the line length appropriately.

Since, in a normal machine configuration, a printing substrate is turned after the recto printing and has to be fed to the printing units again, an expedient configuration provides that, before the printing substrate is fed in again, a measurement of the position of the recto print is made, in order also to take into account any shift in the position of the recto print for controlling the production of the color separations of the verso print in order to achieve coincidence. This ensures that coincidence can be achieved in spite of turning and re-feeding, even when a shift in position, for example, an error in the angular alignment of the printing substrate, has occurred.

With respect to the apparatus, provision is then made for at least one sensor to be arranged to measure the position of the recto print as a printing substrate is fed back to the printing units, and for the controller to also take into account a shift in the position of the recto print to control the production of the color separations of the verso print in order to achieve coincidence. For this purpose, the position of a printing substrate can be registered at the end of the transport belt and/or at the start of said transport belt, after being turned and fed in again. In order to have registration of the position in this way, it is also possible to use sensors, which are present in any case on a printing machine, such as the sensors for aligning the printing substrates.

The invention will be explained below using the drawings, in which:

The invention, and its objects and advantages, will become more apparent in the detailed description of the preferred embodiment presented below.

DETAILED DESCRIPTION OF THE INVENTION

Figure 1:
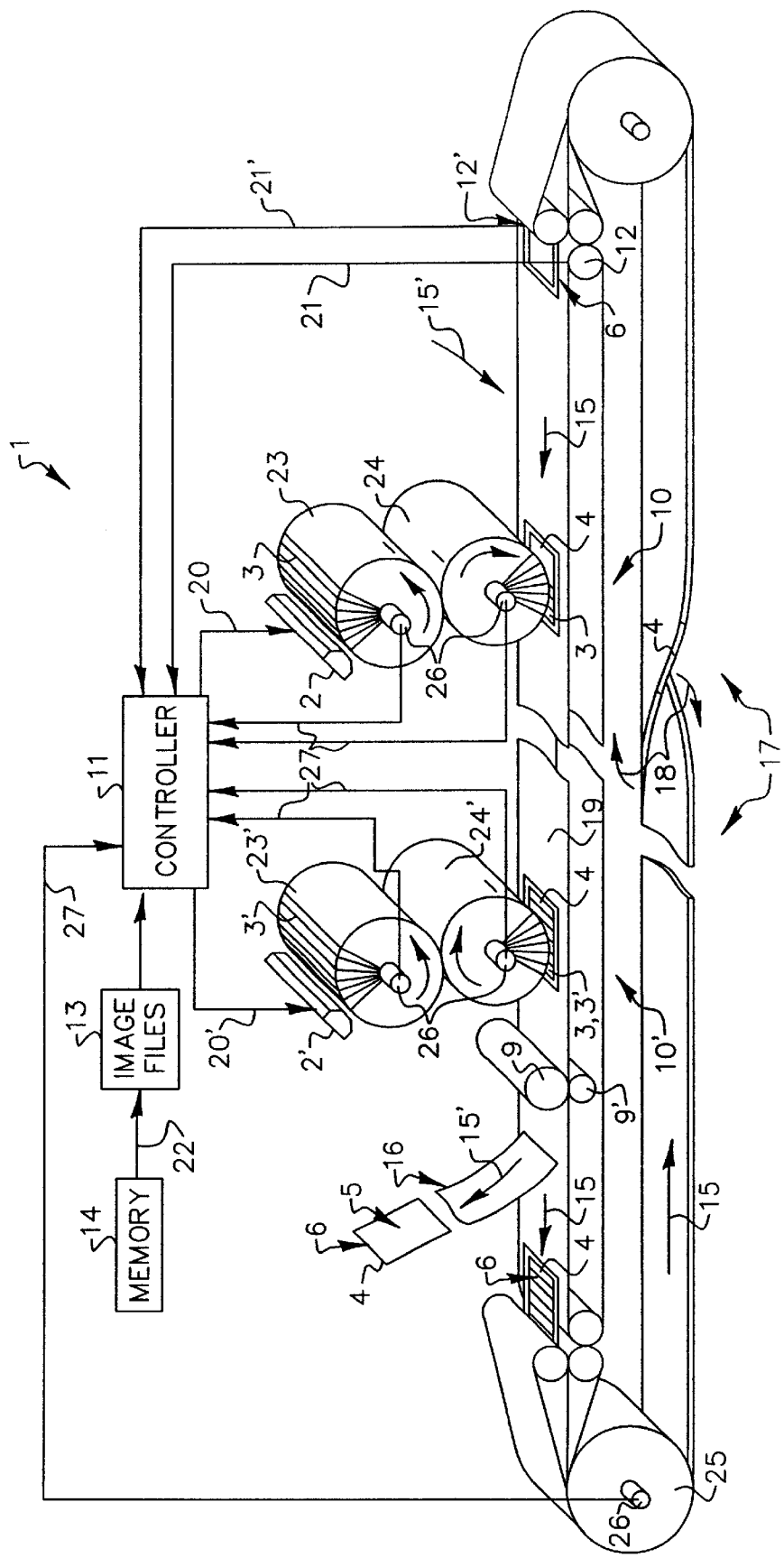
FIG. 1 shows an exemplary embodiment of the invention.

FIG. 1 shows a multicolor printing machine 1 having printing units 10, 10' . . . Normally, multicolor printing machines 1 have four or more printing units, but here only two printing units 10, 10' have been illustrated, for purposes of simplification. Each of these printing units 10, 10', . . . has exposure devices 2, 2', . . . for the digital production of color separations 3, 3' . . . The color separations 3, 3', . . . are applied to image cylinders 23, 23', . . . , and are transferred from the latter to image transfer cylinders 24, 24', . . . and finally, from the latter, to the printing substrates 4. The printing substrates 4 are led through the multicolor printing machine 1 by a transport belt 19 and are provided one after another with, as a rule, four color separations 3, 3', . . . By overprinting the color separations 3, 3', . . . in at least the primary colors, images can be printed in almost any colors.

The multicolor printing machine 1 is constructed as a recto and verso printing machine and, therefore, has a turner device 17. In the turner device 17, the printing substrates 4 are turned as they are transported back from the end of the transport belt 19 to its start, as illustrated by the arrows 18. Here, turner devices 17 can be designed in a very wide range of ways, the illustration is purely symbolic. Printing substrates 4 are fed to the transport belt 19, as indicated by the right-hand arrow 15'. During the first passage through the multicolor printing machine 1, the printing substrates 4 are provided with the recto print 6, remain on the transport belt 19 at the diverter 16 and are fed back to the beginning of the transport belt 19 again via the turner device 17. The rear of the printing substrates 4 is then given the verso print 5, which, as a rule, is composed of four-color separations 3, 3', . . . like the recto print 6.

At the end of each passage through the multicolor printing machine 1, the printing substrate 4 passes through a fuser device 9, 9', which comprises two fuser rollers 9 and 9'. There, the color separations 3, 3', . . . , which are generally applied as electrostatically adhering powder, are melted and, therefore, permanently connected to the printing substrate 4. This procedure is essentially responsible for the dimensions of the printing substrates 4 being changed and, therefore, naturally the dimensions 7, 8 of the recto print 6 as well, which leads to the problem on which the invention is based. It is, therefore, necessary for the verso print 5 to be coordinated with the dimensional changes 7, 7', 8, 8' in the recto print 6, in order that recto print 6 and verso print 9 are located coincidentally on the printing substrate 4 and, as a result, no show-through of the other print 5 or 6 in the area of a print—free edge is possible.

Figure 2:
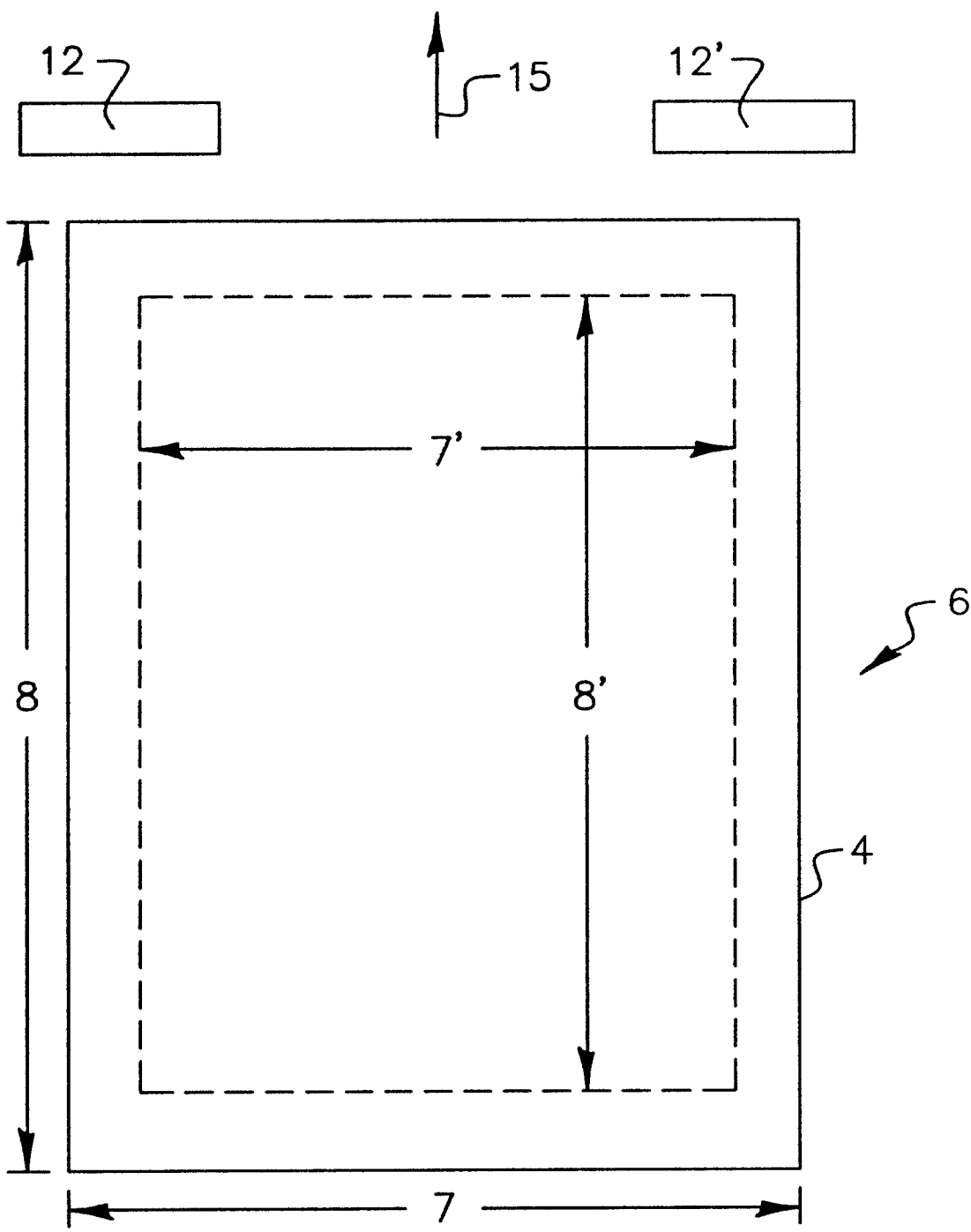
FIG. 2 shows an example of registering changes in the dimensions of a printing substrate.

These changes in the dimensions 7, 8 are illustrated in FIG. 2. The recto print 6 would have the width 7 and the length 8 when it is transferred to the printing substrate, these being changed, generally shrunk, for example, by the fusing or else by other treatments. As a result, the printing substrate 4 has the width 7' and the length 8'. These changes in the dimensions 7, 8, 7', 8' are registered by the recto print 6, after being completed, passing sensors 12 and 12' which register these changes.

It is possible for only the width 7' to be registered, for example, in order to be compared with the original width 7, which is laid down in image files 13. The change in the length 8 to 8' can be registered in a similar way, or it is possible to determine it by computation by storing the ratio of the width change to the length change. However, it is also possible to determine the length 8' by the positions of the drive roller 25 of the transport belt 19 being registered by a rotary encoder 26 and, by these positions, for the sensors 12 and 12' also being able to measure the length 8' in addition to the width 7'. Of course, as already mentioned at the beginning, a very wide range of different possibilities for measuring the dimensions 7, 8 and 7' and 8' are possible.

In the illustration of FIG. 2, the widths 7, 7' and the lengths 8, 8' have been assigned directly to the printing substrate 4, but it is also possible to register these widths 7, 7' and lengths 8, 8' as dimensions of the prints of the recto print 6, the changes being caused by changes in the dimensions of printing substrate 4 and, as a result, being correlated. It is, therefore, possible to register both one and the other. In the exemplary embodiment illustrated, it is the case, for example, that the printing substrate 4 has been printed completely without any edge and, as a result, the dimensions 7, 8, 7', 8' of the recto print 6 are identical with those of the printing substrate 4.

The position of the sensors 12 and 12' at the beginning of the transport belt 19 is shown in FIG. 1. This position can be any desired position. It must merely be located downstream of the fuser device 9, 9', since the latter is primarily responsible for the dimensional changes 7, 8, 7', 8'. The position at the beginning of the transport belt 19 has the advantage that, at the same time as the dimensional changes, it is possible for the sensors 12, 12' to register whether a positional shift or rotation has occurred as a result of the turning 18 and the printing substrates 4 being transported back.

From the sensors 12, 12', the corresponding measurements are fed to a controller 11 via the connections 21, 21'. A controller 11 of this type is present in any case in printing machines, being used to control the production of the color separations 3, 3', ... by the exposure device 2, 2', in such a way that the color separations 3, 3', ... come to rest on one another exactly in registration. A registration control system of a multicolor printing machine 1 can, for example, include the positions of the image cylinders 23, 23', ..., of the image transfer cylinders 24, 24', ... and of the drive roller 25 of the transport belt 19 being registered by these each having rotary encoders 26. The positions determined are transmitted to the controller 1 via connections 27. Accuracy of registration may then be achieved by the appropriate positional coincidence always being controlled to produce the color separations 3, 3', ... by the exposure devices 2, 2', ...

According to the invention, this controller 11 also performs the action of taking into account the change in the dimensions 7, 8, 7', 8' of the recto print 6 to produce the color separations 3, 3', ... of the verso print 5, in order that the latter coincides exactly with the recto print 6. In this case, for example, the dimensions 7', 8' can be registered by the sensors 12 and 12', and the original dimensions 7, 8 are taken from image files 13, which are located in a memory 14. As a rule, such a memory 14 is present in order to make available to the controller 11 all the data, which it needs for a print job. The dimensions 7, 8 of the color separations 3, 3', ... stored as image files 13 essentially correspond to the dimensions 7, 8 at the time of transfer to the printing substrate 4. However, if there are deviations, these can be included in the calculation if such deviations are not eliminated as a result of the fact that they occur identically in the recto print 6 and in the verso print 5.

The illustration of the invention using the exemplary embodiment is, of course, only symbolic and exemplary, since a printing machine can also be constructed in a completely different way, and the application of the invention is irrespective of the actual construction of a multicolor printing machine.

The invention has been described in detail with particular reference to certain preferred embodiment thereof, but it will be understood that variations and modifications can be effected within the spirit and scope of the invention.

Parts List

1 Multicolor printing machine
2,2', . . . Exposure devices for the digital production of color separations
3,3', . . . Color separations
4 Printing substrates
5 Verso print
6 Recto print
7,8 Dimensions of the recto print when transferred to the printing substrate
7', 8' Dimensions of the recto print after its completion, for example after fusing
7, 7' Width of the recto print
8, 8' Length of the recto print
9, 9' Fuser device with two fuser rollers
10,10', . . . Printing units
11 Controller
12, 12' Sensor
13 Image files
14 Memory
15, 15' Arrows: transport directions of the printing substrates
16 Diverter
17 Turner device
18 Arrows: turning the printing substrates
19 Transport belt for printing substrates
20, 20' Connection between the controller and the exposure devices for producing the color separations
21,21' Connection between the sensors and the controller
22 Connection between memory and controller
23,23', . . . Image cylinder
24,24', . . . Image transfer cylinder
25 Drive roller
26 Rotary encoder
27 Connection between rotary encoder and controller

What is claimed is:

1. A method of setting registration in a multicolor printing machine (1) having a number of exposure devices (2, 2') for the digital production of color separations (3, 3'), the print results being registered and used to control the production of the color separations (3, 3') in such a way that in-register prints are achieved, and a change in dimensions (7, 8, 7', 8') of printing substrates (4) being determined by the print, in order to take the change in dimensions into account for renewed printing, wherein changes in the dimensions (7, 8, 7', 8') of a recto print (6) from transfer to a printing substrate (4) up to the completion of said recto print (6) are determined and used to control the digital production of color separations (3, 3') for the verso print (5) to be registered on such substrate of said recto print, whereby after being printed, said verso print coincides with said recto print (6) on such substrate.

2. The method as claimed in claim 1, wherein the dimensions of the printing substrate (4) up to the printing and after the completion of the recto print (6) are used as the correlating measure of changes in dimensions (7, 8, 7', 8') of the recto print (6).

3. The method as claimed in claim 1, wherein dimensions (7', 8') of the recto print (6) are determined after fusing (9, 9') and compared with dimensions (7, 8) of the digitally produced color separations (3, 3') of the recto print (6), the changes in dimensions (7, 8, 7', 8') being used to control digital production of the color separations (3, 3') of the verso print (5).

4. The method as claimed in claim 3, wherein the dimensions (7, 8) are taken from image files (13).

5. The method as claimed in claim 3, wherein one dimension (7 or 8) is measured and the other dimension (8 or 7) is calculated from a previously determined relationship between the length change and width change.

6. The method as claimed in claim 5, wherein account is taken of the changes in the dimensions (7, 8, 7', 8') by the line spacing of image lines and/or line length of the color separations (3, 3') for the verso print (5) being changed in order to achieve coincidence.

7. The method as claimed in claim 6, wherein before a printing substrate (4) is fed to printing units (10, 10') of said printing machine (1) again, a measurement of the position of the recto print (6) is made, in order also to take into account a shift in the position of the recto print (6) for controlling the production of the color separations (3, 3') of the verso print (5) in order to achieve-coincidence.

8. Apparatus for a multicolor printing machine (1) having a number of exposure devices (2, 2') for the digital production of color separations (3, 3'), a controller (11) controlling the production of the color separations (3, 3') in order to achieve in-register prints on a substrate, wherein the controller (11) uses changes in dimensions (7, 8, 7', 8') of a recto print on a substrate to control the digital production of the color separations (3, 3') for a verso print (5) to be registered on such substrate of said recto print, whereby after being printed, said verso print coincides with said recto print (6) for such substrate.

9. The apparatus as claimed in claim 8, wherein at least one sensor (12, 12') is arranged such that the changes in dimensions (7, 8, 7', 8') of said recto print (6) from the transfer to a printing substrate (4) up to the completion of said recto print (6) can be determined.

10. The apparatus as claimed in claim 9, wherein said at least one sensor (12, 12') is arranged such that dimensions of a printing substrate (4) up to the printing and after the completion of a recto print (6) can be registered as a correlating measure of the changes in the dimensions (7, 8, 7', 8') of said recto print (6).

11. The apparatus as claimed in claim 10, wherein said at least one sensor (12, 12') is arranged such that it determines dimensions (7', 8') of said recto print (6) after fusing (9, 9'), and wherein said controller (11) compares these dimensions (7', 8') with the dimensions (7, 8) of digitally produced color separations (3, 3') of said recto print (6), and controls the digital production of the color separations (3, 3') of a verso print (5) on this basis in order to achieve coincidence.

12. The apparatus as claimed in claim 11, wherein a memory (14) for image files (13) is provided, and said controller (11) takes dimensions (7, 8) from said image files (13).

13. The apparatus as claimed in claim 12, wherein said at least one sensor (12, 12') is arranged such that it registers the width (7) of a completed recto print (6).

14. The apparatus as claimed in claim 13, wherein said at least one sensor (12, 12') is arranged such that it measures the length (8) of a completed recto print (6).

15. The apparatus as claimed in claim 14, wherein said controller (11) uses a dimension (7 or 8) measured by said at least one sensor (12, 12') to calculate the other dimension (8 or 7) on the basis of a previously determined relationship between the length change and width change.

16. The apparatus as claimed in claim 15, wherein said controller (11), in order to achieve coincidence, varies line spacing of image lines and/or line length of the color separations (3, 3') of a verso print (5) appropriately.

17. The apparatus as claimed in claim 16, wherein said at least one sensor (12, 12') is arranged to measure the position of a recto print (6) as a printing substrate (4) is fed back to printing units (10, 10') of said printing machine (1), and wherein said controller (11) also takes into account a shift in the position of said recto print (6) to control the production of the color separations (3, 3') of said verso print (5) in order to achieve coincidence.

18. The apparatus as claimed in claim 17, wherein the function of said sensors (12, 12') is performed by sensors, which are provided to align printing substrates (4).

* * * * *